United States Patent [19]
Anderson et al.

[11] Patent Number: 6,093,014
[45] Date of Patent: Jul. 25, 2000

[54] APPARATUS FOR REMOVING HOLLOW CONTAINERS FROM A BLOW MOLDING MACHINE

[75] Inventors: Jack B. Anderson; James E. Gerdeman, both of Sylvania, Ohio

[73] Assignee: Owens-Illinois Plastic Products Inc., Toledo, Ohio

[21] Appl. No.: 09/330,630

[22] Filed: Jun. 11, 1999

Related U.S. Application Data

[62] Division of application No. 08/941,748, Sep. 30, 1997, Pat. No. 5,939,014, which is a continuation of application No. 08/510,018, Aug. 1, 1995, abandoned.

[51] Int. Cl.[7] .................................................. B29C 49/70
[52] U.S. Cl. .............. 425/537; 425/806; 425/DIG. 108; 198/689.1
[58] Field of Search .......................... 425/403.1, 436 RM, 425/437, 527, 537, 806, DIG. 60, DIG. 108; 198/471.1, 606, 620, 689.1, 861.5, 817

[56] References Cited

U.S. PATENT DOCUMENTS

| | | | |
|---|---|---|---|
| 3,352,404 | 11/1967 | Settembrini | 198/453 |
| 3,359,648 | 12/1967 | Overly et al. | 198/689.1 |
| 3,426,884 | 2/1969 | Donner | 198/434 |
| 3,529,329 | 9/1970 | Burleson | 264/536 |
| 3,628,654 | 12/1971 | Haracz | 264/509 |
| 3,877,592 | 4/1975 | Krenke et al. | 425/537 |
| 3,889,801 | 6/1975 | Boyer | 425/540 |
| 3,985,096 | 10/1976 | Guimbretiere | 29/335 |
| 4,070,428 | 1/1978 | Krall et al. | 198/803.5 |
| 4,136,767 | 1/1979 | Sarovich | 198/689.1 |
| 4,213,750 | 7/1980 | Kubota et al. | 198/626.1 |
| 4,304,508 | 12/1981 | Wolf | 406/78 |
| 4,406,359 | 9/1983 | Cole et al. | 425/531 |
| 4,480,742 | 11/1984 | Muylle | 198/404 |
| 4,560,060 | 12/1985 | Lenhart | 264/530 |
| 4,614,018 | 9/1986 | Krall | 118/58 |
| 4,648,831 | 3/1987 | Johnson | 198/689.1 |
| 4,718,535 | 1/1988 | Wolff | 198/424 |
| 4,834,643 | 5/1989 | Klinedinst et al. | 414/416 |
| 4,983,349 | 1/1991 | Krall et al. | 198/689.1 |
| 5,156,798 | 10/1992 | Bruning | 24/200 |
| 5,234,097 | 8/1993 | Okuyama | 198/379 |
| 5,284,238 | 2/1994 | Ingraham | 34/654 |
| 5,311,979 | 5/1994 | Risley et al. | 198/456 |
| 5,326,219 | 7/1994 | Pippin et al. | 425/503 |
| 5,358,234 | 10/1994 | Boriani et al. | 271/225 |
| 5,373,933 | 12/1994 | Planke et al. | 198/689.1 |
| 5,458,479 | 10/1995 | Minghetti | 414/797.6 |
| 5,960,933 | 10/1999 | Albrecht | 198/689.1 |

FOREIGN PATENT DOCUMENTS

| | | |
|---|---|---|
| 25 21 834 | 11/1976 | Germany. |
| 3001531 | 7/1981 | Germany. |

*Primary Examiner*—Harold Pyon
*Assistant Examiner*—Donald Heckenberg

[57] ABSTRACT

In an apparatus wherein a plastic blow molding machine is operated to make hollow containers which are discharged and fall by gravity out of the machine wherein an endless moving conveyor which includes closely spaced vacuum cups is provided and positioned such that a reach of the conveyor is positioned horizontally and such that the vacuum cups face upwardly to grab and hold the plastic containers as they are discharged such that containers are held in axial alignment and circumferential orientation to one another.

14 Claims, 7 Drawing Sheets

APPARATUS FOR REMOVING HOLLOW CONTAINERS FROM A BLOW MOLDING MACHINE

This application is a division of application Ser. No. 08/941,748 filed Sep. 30, 1997 and now U.S. Pat. No. 5,939,014, which is a continuation of application Ser. No. 08/510,018 filed Aug. 1, 1995 and now abandoned.

This invention relates to a blow molding apparatus.

BACKGROUND AND SUMMARY OF THE INVENTION

In blow molding machines of the wheel type, a wheel supports a plurality of circumferentially spaced sets of molds and is generally rotated about a horizontal axis. Plastic tubing is continuously extruded downwardly between the open mold sections and then the molds are closed as they move about an annular path and the portion of the tubing within the molds is blown within the confines of the mold to provide a hollow article which may be a container.

When formed in dies, hollow plastic articles such as containers or bottles usually have flash in at least one of the shoulder, neck and finish areas. The finish also has material which must be removed to provide an end face for sealing engagement with a closure or cap engageable with the neck of the article.

The present invention is directed to the problem of receiving containers or bottles from the plastic mold machine and delivering them to the trimming apparatus. In prior systems, the containers fall when the molds are open, bounce, turn-over and require orientation for delivery to the trimming apparatus. Among the objectives of the present invention are to provide a method and apparatus for removing containers from the molding machine and maintaining orientation of the container with respect to a delivery conveyor both with respect to the longitudinal axis of the container and the circumferential orientation of the container; which method and apparatus provides for uniform acceleration of the containers to delivery speed to the trimming apparatus without loss of such orientation.

In accordance with the invention, the containers are delivered from a molding machine in the customary fashion wherein the molding machine has molds traveling in a circular path and are ejected, free-falling in the usual manner. Further, in accordance with the invention, a moving vacuum cup conveyor belt is provided which is constructed and arranged to grab the body of the container as it comes into contact with the cups, maintaining the orientation of the container as the container is accelerated to line speed of the conveyor. The conveyor delivers the containers to the trimming apparatus through a belt conveyor which is in timing relation to the vacuum cup conveyor. In a preferred form, the flash end of the container is supported by a flat belt operating at the same speed as the vacuum cup belt.

DESCRIPTION OF THE PREFERRED EMBODIMENTS

Figure 1:
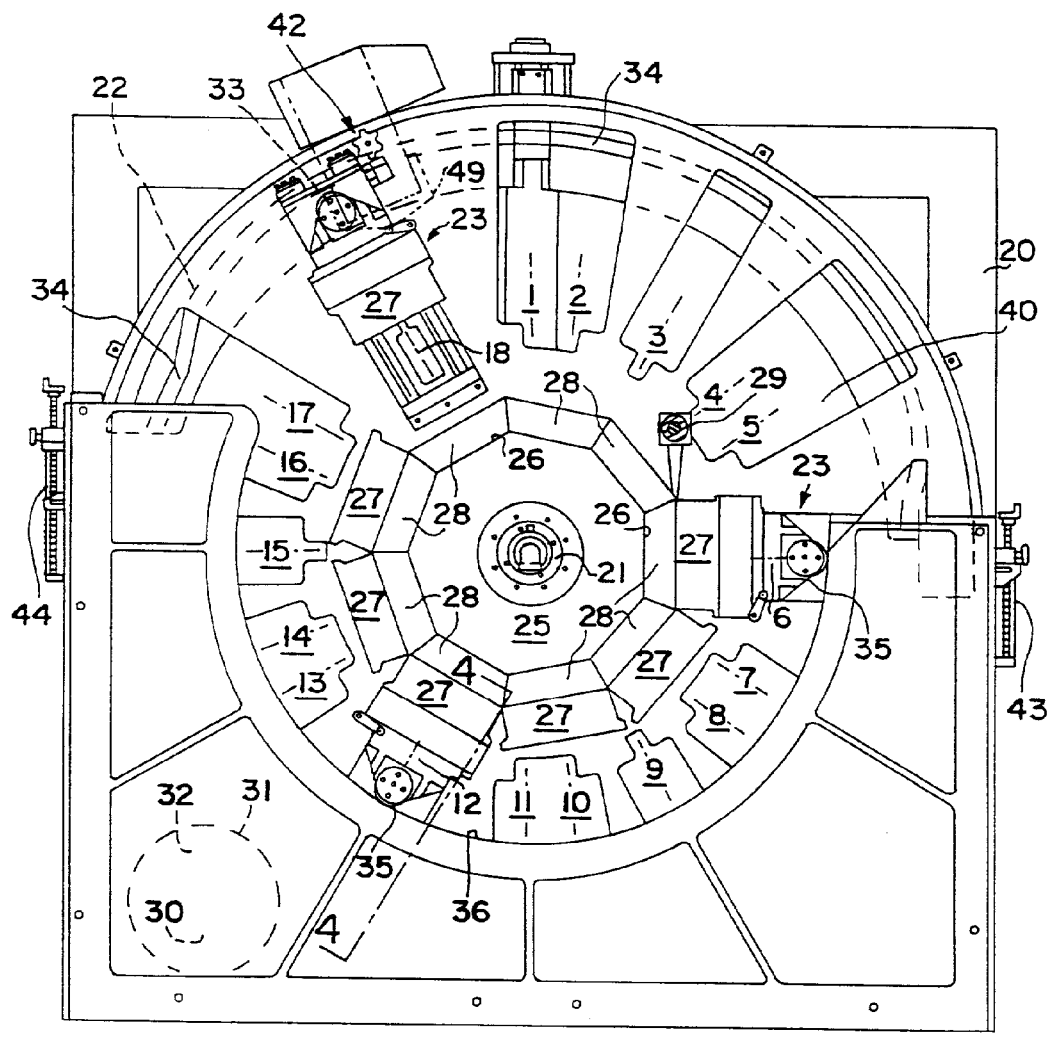
FIG. 1 is a front elevational view of a blow molding apparatus, parts being broken away.
Figure 2:
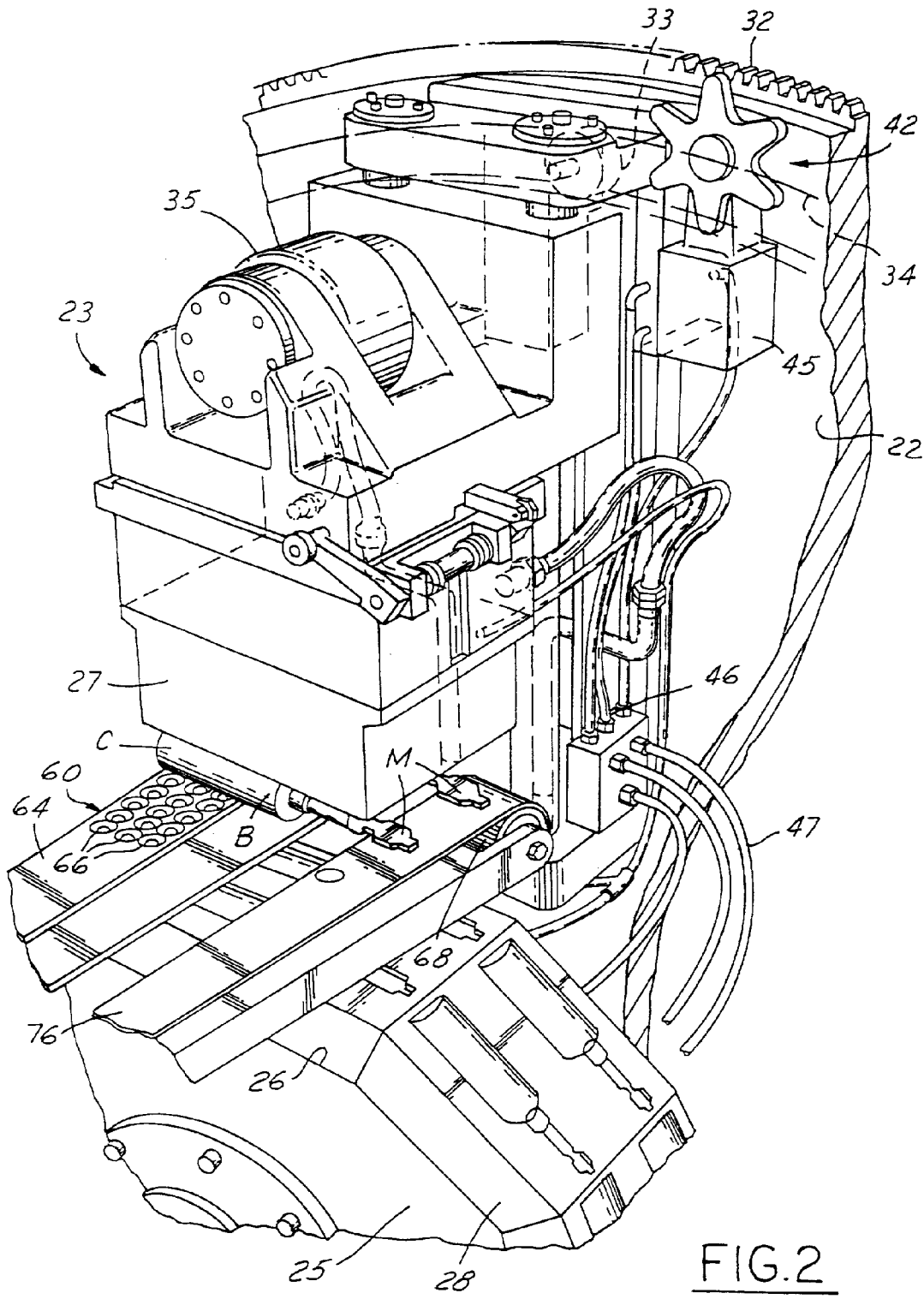
FIG. 2 is a fragmentary perspective view of a blow molding machine embodying the invention.

Referring to FIGS. 1 and 2 in one type of plastic blow molding machine shown in U.S. Pat. No. 4,549,865, there is disclosed the blow molding apparatus embodying the invention that comprises a frame 20 in which a shaft 21 is mounted for rotation about horizontal axis by spaced bearings in cantilever fashion. A wheel plate 22 is mounted on the shaft 21 for rotation with the shaft 21 and supports a plurality of circumferentially spaced slide assemblies 23. A hub 25 is also mounted on the shaft and has a plurality of circumferentially spaced mold supporting surfaces 26 corresponding in number to the number of slide assemblies 23.

Each slide assembly 23 comprises mold section mounting means for supporting a section or part 27 of mold and the corresponding surface 26 of the hub 25 supports the second section 28 of a mold. Each slide assembly 23 is adapted to move the mold section 27 toward and away from the other mold section 28 to close about a plasticized parison emanating from an extruder head 29 so that the parison can be blown to the shape of the mold cavity defined by the mold sections 27, 28 as the wheel rotates. The parison is provided from the head 29 of an extruder in the two o'clock position as shown in FIG. 1.

Wheel plate 22 is rotated by a gear 30 driven by a motor 31 and meshing with a gear 32 on the periphery of the wheel plate 22. Each slide assembly 23 includes a cam follower 33 which engages a fixed arcuate cam 34 on the frame 20 to move mold section 27 toward and away from mold section 28. A second cam follower 35 on each slide assembly 23 engages a second fixed cam 36 on frame 20 to hold the mold sections 27, 28 in closed and clamped position. Second cam 36 extends generally from the three o'clock position to just beyond the nine o'clock position as viewed in FIG. 1. The specific structure of each slide assembly 23 is disclosed and claimed in U.S. Pat. No. 4,648,831, which is incorporated herein by reference.

An air valve assembly 42 is provided on each slide assembly 23 and is actuated by an actuator 43 along the path of the molds that functions to turn the blow air on for blowing the article and another actuator 44 is provided along the path to function to turn the air valve assembly 42 thereby of, thereby cutting off the flow of blow air to the blowing apparatus. Each valve assembly 42 includes an on-off valve 45 that functions to control the flow of blow air to a valve block 46 and, in turn, through lines 47 to a blow pin (not shown) which functions to provide blow air for blowing the hollow article when the molds are closed, in a manner well known in the art. The valve assemblies 42 and actuator assemblies 43, 44 are disclosed and claimed in U.S. Pat. No. 4,523,904, which is incorporated herein by reference.

In operation, the plastic material is continuously extruded in tubular form from the head 29 of the extruder and flows downwardly between the mold sections 27, 28. As the wheel plate continues to rotate, the mold sections 27, 28 are brought together for pinching the plastic material, and then air is supplied to the interior of the tubular parison to blow the article in a manner well know in the art. As the article reaches the position when the blow mold is open (12 o'clock position as viewed in FIG. 1), a fixed actuator 49 contacts an ejector on each mold section 28 to eject the articles onto a conveyor.

Figure 3:
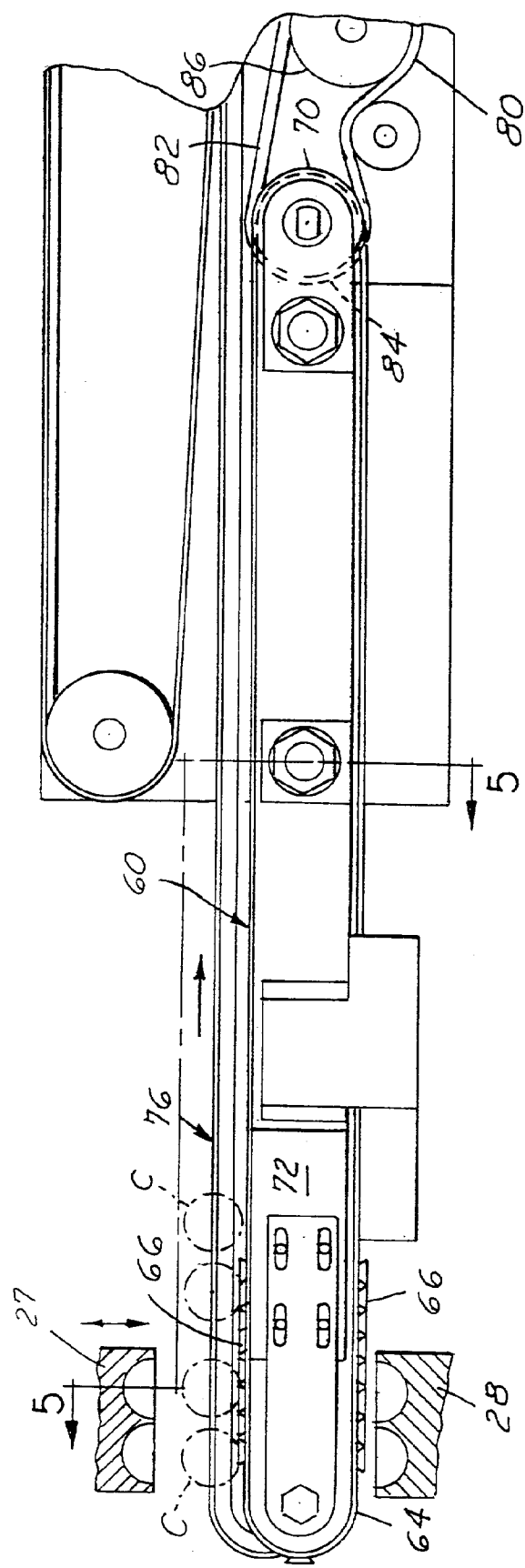
FIG. 3 is a part sectional fragmentary elevational view taken longitudinally through the vacuum cup take out conveyor.
Figure 4:
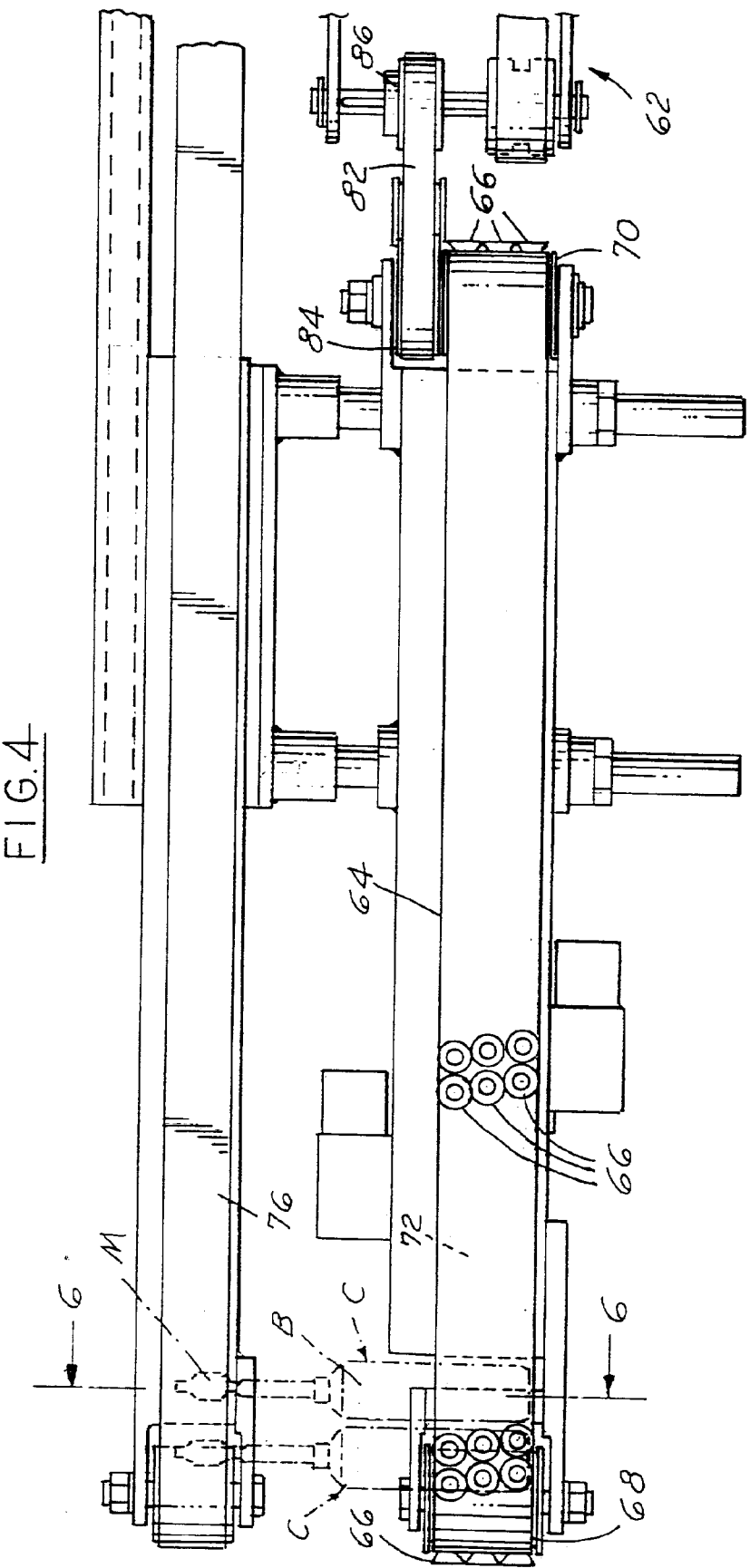
FIG. 4 is a plan view of the conveyor shown in FIGS. 2 and 3.
Figure 7:
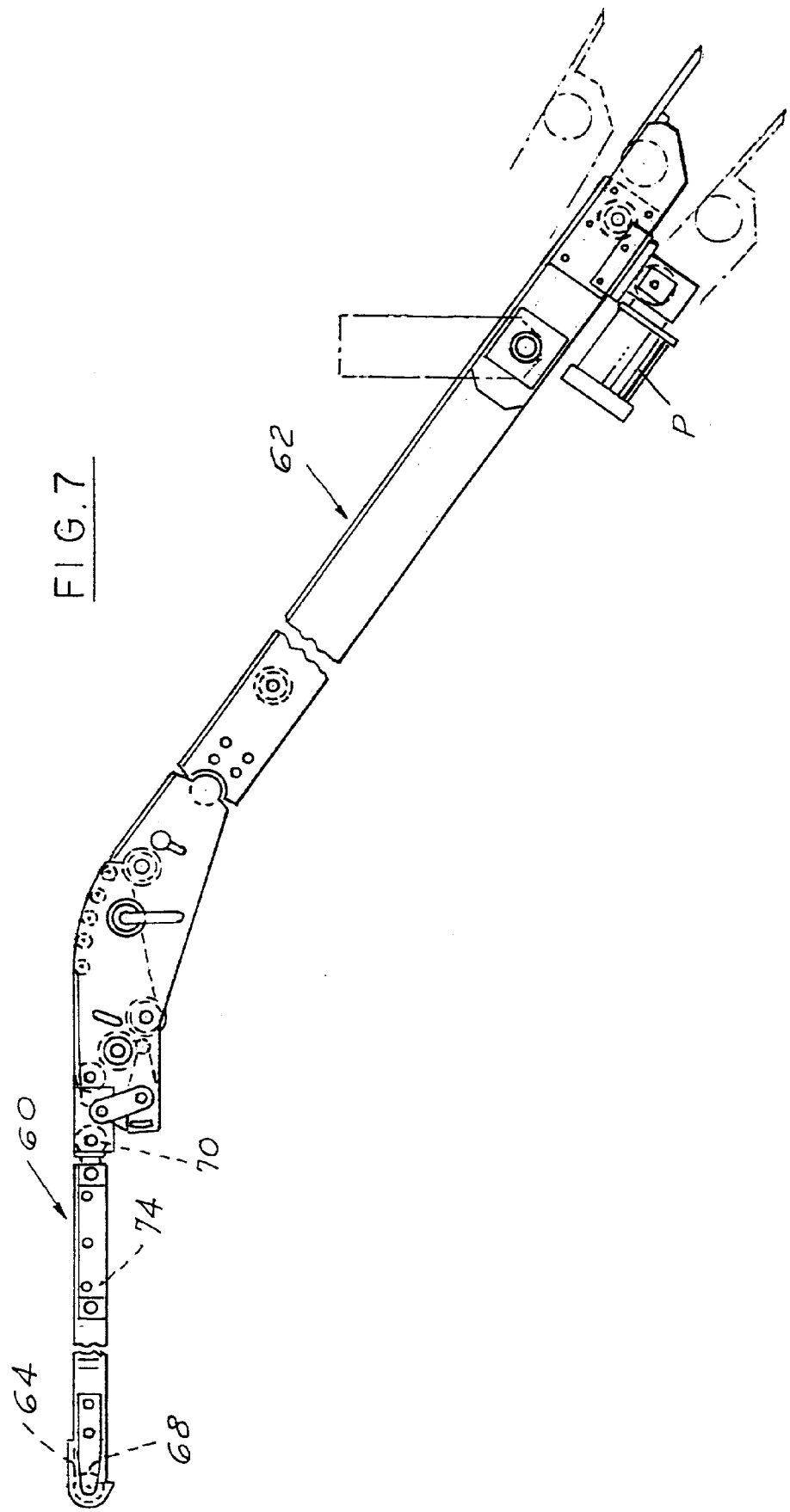
FIG. 7 is a side elevational view of the vacuum cup take out conveyor and delivery conveyor.

In accordance with the invention, a vacuum cup conveyor system 60 is positioned to extend between the molds, when the molds are open, and receive the falling containers which have been molded, and grab the containers and move them in an oriented fashion to a delivery conveyor 62 (FIG. 4) to the trimming apparatus which may be of the type shown in U.S. Pat. No. 4,614,018, incorporated herein by reference. Conveyor 62 is also of the endless belt type (FIGS. 3 and 4) and, as best seen by the conveyor framework illustrated in FIG. 7, delivery conveyor 62 is adjustable angularly with respect to vacuum conveyor 60. Each container C includes a body portion B and a moil portion M (FIG. 4).

Figure 5:
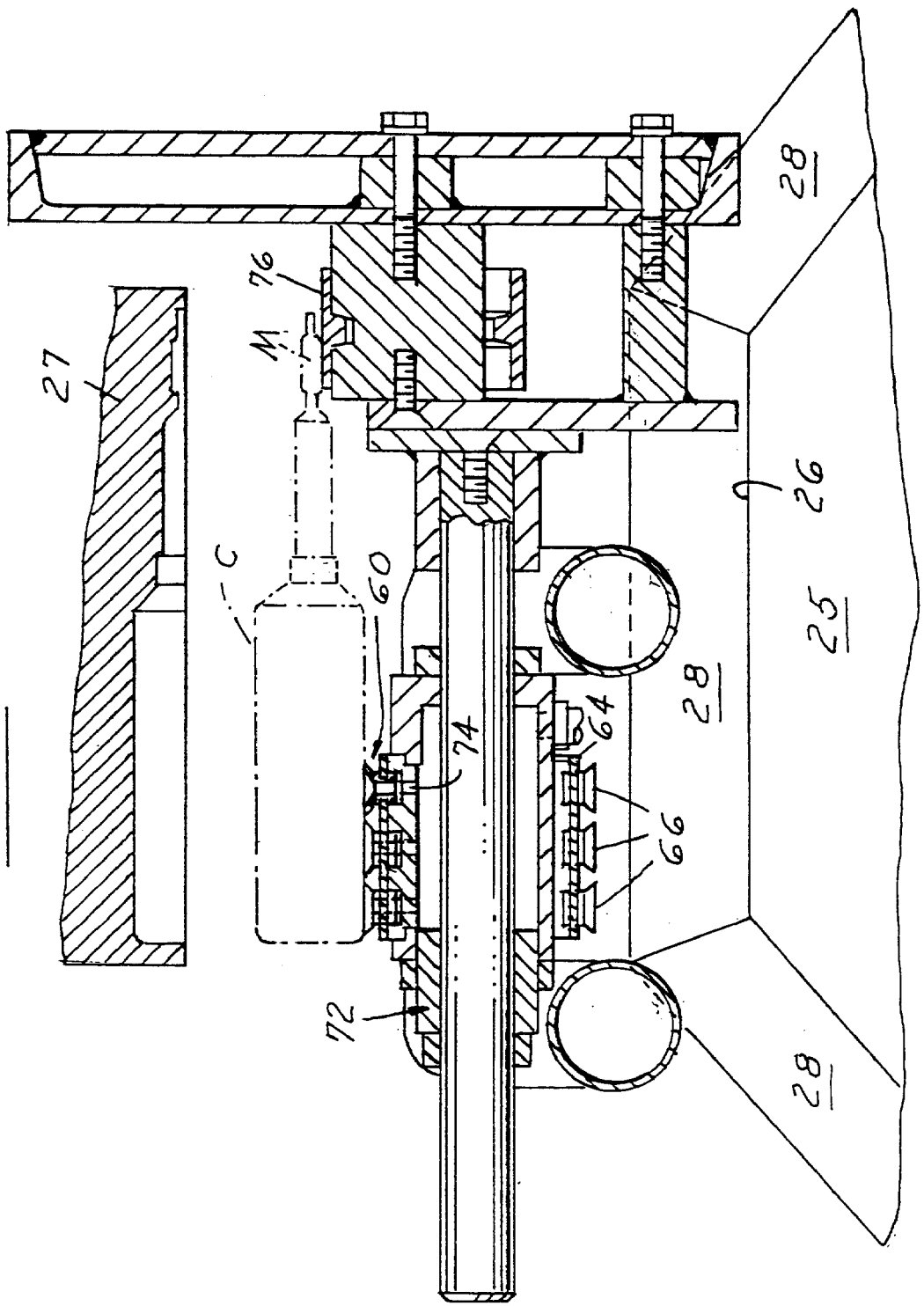
FIG. 5 is a fragmentary sectional view on an enlarged scale taken along the line 5—5 in FIG. 3.
Figure 6:
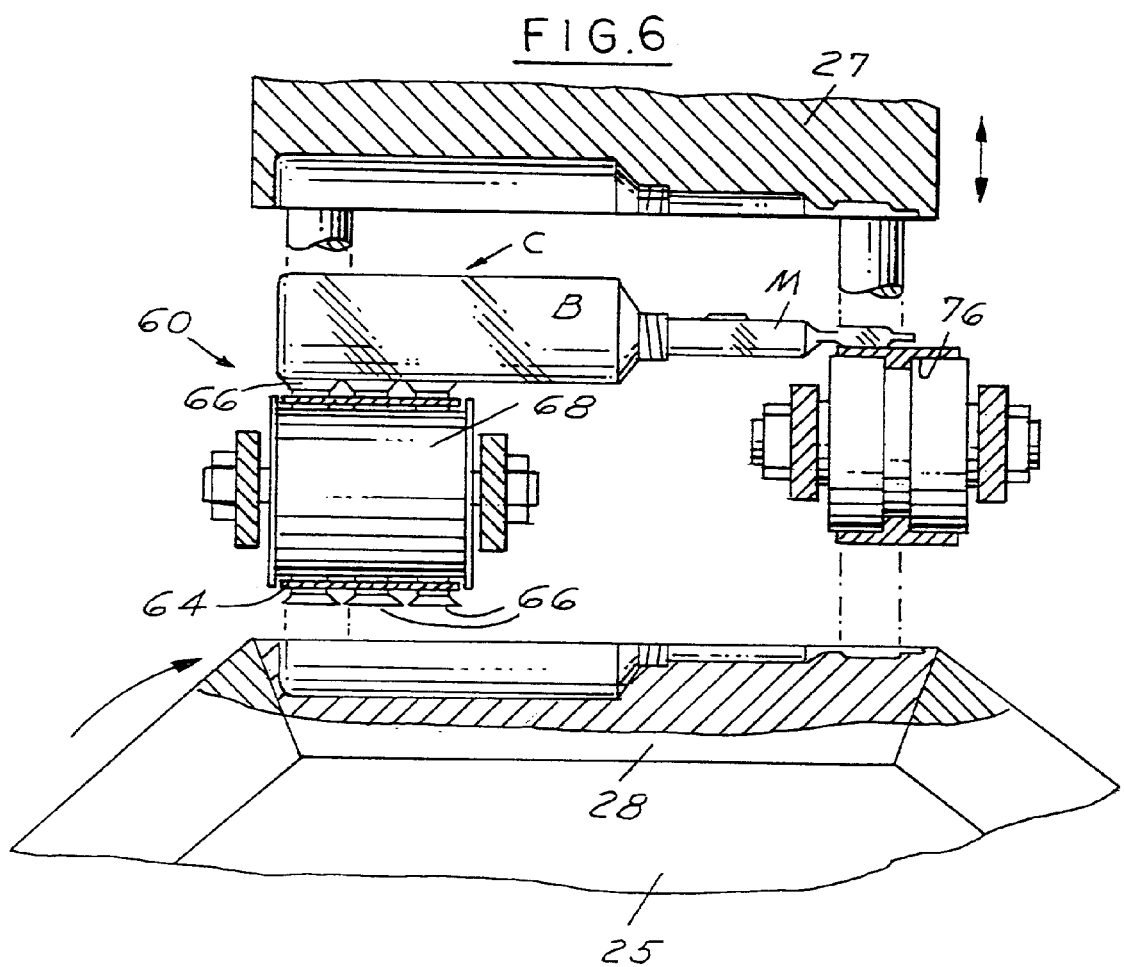
FIG. 6 is a sectional view taken along the line 6—6 in FIG. 4.

Referring to (pg. 11) FIG. 2, and also to FIGS. 3–7, the vacuum cup conveyor 60 comprises an endless belt 64 which supports a plurality of hollow stem vacuum cups 66 (FIG. 5) each of which has a diameter which is substantially less than the diameter of the body portion B of the container C. As shown in FIG. 5, the belt 64 is trained over pulleys 68, 70 and is supported between the pulleys by a plenum 72 that has an upper wall with openings 74 communicating with associated plenum troughs that in turn communicate with openings in the belt provided by the hollow stems of cups 66, the troughs extending below the travel path each 20 vacuum cup 66. As further shown in FIG. 5, the plenum 72 is positioned so that the lower reach of the belt 64 is below the plenum 72. Vacuum is supplied to the plenum 72 such that the portion of the belt passing over the plenum is supplied with vacuum.

Preferably, an endless belt 76 (FIG. 2 and 3) is provided for supporting the generally planar moil M of each container as the container accelerates and is moved toward the trimming apparatus. The vacuum cup conveyor 64 is driven in timed relationship with an endless belt delivery conveyor 80 through a timing belt 82 and associated pulleys 84, 86, (FIGS. 3 and 4) driven by motors P. (FIG. 7) in similar fashion the moil belt 76 is driven in timed relationship.

The size and spacing of the vacuum cups is selected such that at least one and preferably two or more vacuum cups contact the body of the container diametrically and at least two and preferably three or more vacuum cups contact the container axially. In addition, the vacuum cups are in substantial tangential relationship. In order to maximize contact, the vacuum cups are provided in rows extending transversely of the conveyor belt and which roms are inclined at an angle to the direction of movement of the vacuum conveyor as best see in FIG. 4.

As each pair of containers C fall from the open mold when the vacuum is released holding the container in the upper mold, the pair of containers is immediately grabbed by the vacuum cups so that the axes of the containers remain parallel to that of the mold so that any rotation about the axis of the container is prevented. As a result, the moil M remains horizontal as it was in the mold. Each pair is thus oriented and spaced for direct delivery on the trimming apparatus such as shown in the U.S. Pat. No. 4,616,018.

What is claimed is:

1. In apparatus wherein a plastic blow molding machine is operated to make hollow containers which are formed in blow molds such that the containers have an axis and the containers are discharged onto a conveyor and fall by gravity onto the conveyor, for delivery to a trimming apparatus, the improvement which comprises:

an endless moving conveyor which includes closely spaced hollow stem vacuum cups each having a concave gripping face, means for moving said endless conveyor in a path below the discharge of containers from said machine with said vacuum cup gripping faces oriented in a co-planar array in said path, and means for continually supplying a vacuum to the gripping faces of said vacuum cups through the hollow stems of said vacuum cups as they move into position for receiving said containers from said machine and thereafter moving to a conveyor container discharge station, a reach of said endless conveyor being positioned with respect to the containers as they are discharged such that said reach of the conveyor extends in a direction such that the axis of each container is transverse to the direction of movement of said conveyor and said reach of said conveyor is positioned horizontally with the gripping faces of said vacuum cups facing upwardly so that the vacuum cups grip and hold the sides of the plastic containers in the axial orientation imparted thereto by the associated blow molds as they are discharged onto said vacuum cups, and said containers are thereafter held by the vacuum cups in axial side-by-side alignment and maintained in their original as-gripped circumferential orientation relative to one another transversely of the container as they are carried as so gripped and held by the vacuum cups to said conveyor container discharge station for delivery to a trimming apparatus.

2. The apparatus set forth in claim 1 wherein the endless conveyor comprises an endless belt conveyor that includes an upper reach and a lower reach, and said upper reach is positioned for receiving said containers and said vacuum is applied to said upper reach.

3. The apparatus set forth in claim 2 wherein said vacuum cups are disposed in rows transverse to the direction of movement of said vacuum conveyor, each row having an axis inclined to the direction of movement of said vacuum conveyor.

4. The apparatus set forth in claim 3 wherein the containers are delivered in said axial and circumferential orientation to a trimming apparatus.

5. The apparatus set forth in claim 3 wherein each of the hollow containers has a body sidewall with an exterior surface that is curved in cross-section radially about the container axis, and each container is gripped and held by the vacuum cups engaging the curved exterior surface of each container.

6. The apparatus set forth in claim 5 wherein said vacuum cups have a size and a spacing such that at least one of said vacuum cups contacts each container body sidewall diametrically and at least two of said vacuum cups contact each container body sidewall axially.

7. The apparatus set forth in claim 6 wherein said size and spacing causes at least two of said vacuum cups to contact each container body sidewall diametrically and at least three of said vacuum cups to contact each container body sidewall axially.

8. The apparatus set forth in claim 7 wherein said vacuum cups are positioned on said conveyor in a substantially tangentially contacting array.

9. The apparatus set forth in claim 1 wherein said containers are discharged in pairs onto said reach such that each pair of said containers is held in axial alignment and circumferential orientation when they are gripped and held by said vacuum cups on said conveyor.

10. The apparatus set forth in claim 1 wherein the endless conveyor includes an upper reach and a lower reach, and said means for applying said vacuum comprises a plenum beneath said upper reach.

11. The apparatus set forth in claim 10 wherein said vacuum cups are positioned in rows transversely of the vacuum conveyor, each row having an axis inclined to the direction of movement of the conveyor.

12. The apparatus set forth in claim 1 including an endless delivery conveyor aligned with said endless moving conveyor and driven in synchronism with said endless moving conveyor for delivering said axially aligned and oriented containers to a trimming apparatus.

13. The apparatus set forth in claim 12 wherein said delivery conveyor is adjustable angularly with respect to said endless moving conveyor.

14. The apparatus set forth in claim 13 wherein each container has a moil, and wherein said delivery conveyor engages the moils of said containers.

* * * * *

UNITED STATES PATENT AND TRADEMARK OFFICE
CERTIFICATE OF CORRECTION

PATENT NO. : 6,093,014
DATED : July 25, 2000
INVENTOR(S) : Jack B. Anderson and James E. Gerdeman It is certified that error appears in the above-identified patent and that said Letters Patent is hereby corrected as shown below:

Please correct the name of the Assignee from "Owens-Illinois Plastic Products Inc." to -- Owens-Brockway Plastic Products Inc.--

Signed and Sealed this

Seventeenth Day of April, 2001

Attest:

NICHOLAS P. GODICI

Attesting Officer     Acting Director of the United States Patent and Trademark Office